United States Patent [19]

Rangel

[11] Patent Number: 5,492,439
[45] Date of Patent: Feb. 20, 1996

[54] MULTI-PURPOSE ARROW ASSEMBLY TOOL

[76] Inventor: Louis Rangel, 11 N. 3175 East, Layton, Utah 84040

[21] Appl. No.: 456,069

[22] Filed: May 31, 1995

Related U.S. Application Data

[62] Division of Ser. No. 181,171, Jan. 12, 1994, Pat. No. 5,435,673.

[51] Int. Cl.⁶ .................................................. B23B 45/06
[52] U.S. Cl. .......................... 408/201; 408/199; 408/231
[58] Field of Search .................................. 408/80, 81, 82, 408/199, 200, 201, 227, 229, 231, 233, 239 R, 228; 7/157, 158

[56] References Cited

U.S. PATENT DOCUMENTS

| | | | |
|---|---|---|---|
| 3,020,787 | 2/1962 | Cusick | 408/201 |
| 3,763,510 | 10/1973 | Graham | 7/158 |
| 4,405,269 | 9/1983 | Hertzler | 408/239 R |
| 4,573,839 | 3/1986 | Finnegan | 408/239 R |
| 5,004,383 | 4/1991 | Elliot, Jr. | 7/157 |
| 5,064,320 | 11/1991 | Markle | 7/157 |
| 5,435,673 | 7/1995 | Rangel | 408/239 R |

*Primary Examiner*—Daniel W. Howell
*Attorney, Agent, or Firm*—Workman, Nydegger & Seeley

[57] ABSTRACT

A multi-purpose arrow shaft assembly tool is provided having several implements capable of being received within a handle. One of the implements is an insert arbor over which point inserts and nock inserts may be placed which the inserts are heated and inserted into the hollow arrow shaft. To aid in preparing the shaft for receipt of the inserts, a facing cutter and a burring tool are also provided. The facing cutter has an arbor which guides the cutting blade of the facing cutter to produce a perpendicular cut relative to the longitudinal axis of the arrow shaft. The burr is housed within the handle so that the interior of the handel serves as a guide when deburring the arrow shaft. A nock adjusting implement is also provided which not only aids in the rotation of a friction fit nock within the nock insert, but also serves to record and transfer the relationship between the groove in the nock and one of the veins so that indexing of one arrow may be transferred to other arrows. Other implements such as a hone can be utilized to sharpen broad head points and a chamfer cup can be utilized to chamfer the outer edge of an arrow shaft after the arrow shaft has been cut. A shaft stripping implement is also provided capable of quickly and easily removing the adhesive and fletching from the arrow shaft without gouging the arrow shaft.

2 Claims, 4 Drawing Sheets

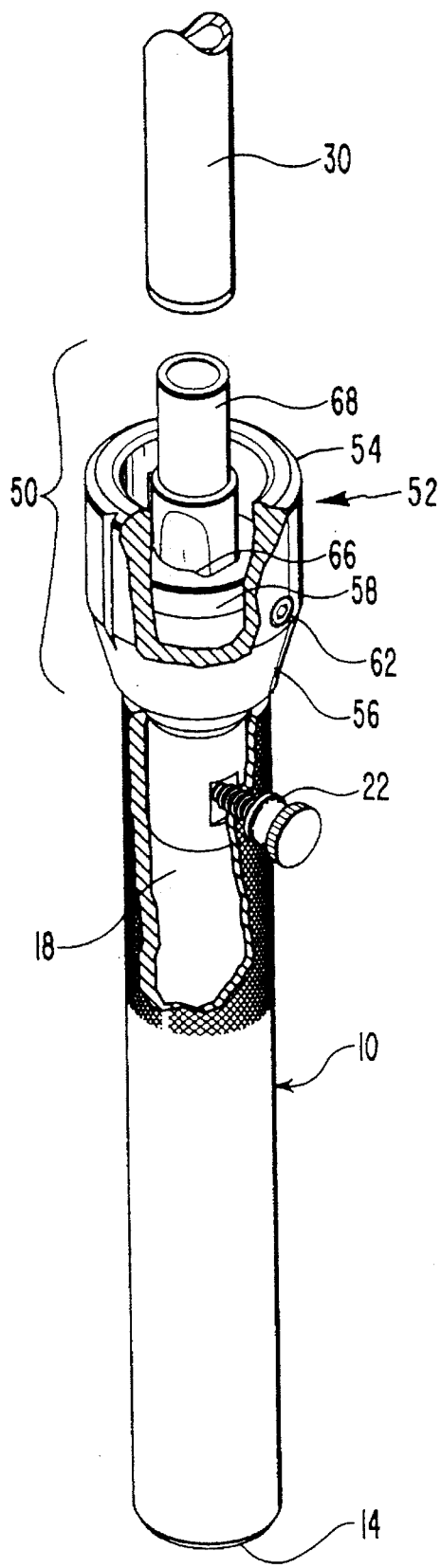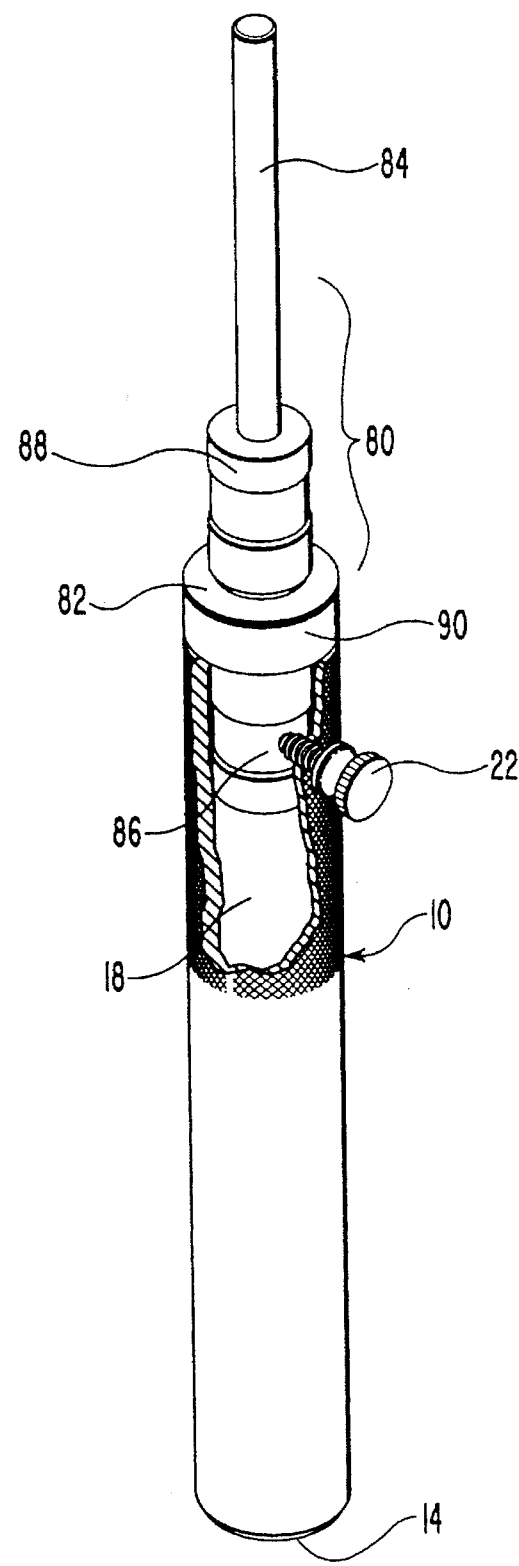
FIG. 4
FIG. 5

MULTI-PURPOSE ARROW ASSEMBLY TOOL

This application is a divisional of application Ser. No. 08/181,171, filed Jan. 12, 1994, now U.S. Pat. No. 5,435,673.

BACKGROUND

1. Field of the Invention

This invention relates generally to the field of archery and more specifically to tools intended for use in assembling the components of an arrow.

2. Background Art

Although individuals have relied upon archery to provide subsistence for centuries, modern archers are typically engaged in archery for more recreational purposes. Due to the introduction of modern materials such as aluminum, fiberglass, carbon fiber, and nylon, faster and more accurate arrows can now be produced. The increased levels of accuracy made possible by these new strong and lightweight materials have driven competition among archers to new heights. These high-tech materials, unfortunately, have also driven the cost of modern archery equipment to prohibitive levels. To reduce the cost of archery equipment, many individuals have begun purchasing arrow shaft materials and then assembling the components of the arrow themselves. The finishing of arrow shafts and assembling of components to that shaft has led to a reduction in the cost of archery for many individuals but has also introduced some new problems.

For example, the lightweight materials of which arrow shafts are made cannot be properly cut utilizing tools appropriate for stronger materials such as tubing cutters or saw blades. Pressure from the tubing cutter or saw blade deforms a lightweight arrow shaft and creates burrs at the end of the arrow shaft which may adversely affect the alignment of components added to the shaft in the assembly process.

Whereas professional archery shops utilize a motorized abrasive filament to properly cut lightweight arrow shafts, such cutting devices are prohibitively expensive for most individuals. As a result, the cutting of arrow shafts to custom lengths may not be, depending on the materials utilized, properly accomplished by most individuals without the aid of a professional archery shop.

After an arrow shaft has been cut to a custom length, the cut portion is deburred and made square or perpendicular to the longitudinal axis of the arrow shaft. If carbon fiber arrow shafts are used, the outside radius of the cut shaft must also be chamfered. This is typically accomplished by rotating the shaft on sandpaper.

A point insert is next pressed into the point end of the arrow shaft and a nock insert is pressed into the nock end of the arrow shaft. These metallic inserts are held in the arrow shaft by a heat-sensitive adhesive. Each insert is typically held by pliers while a propane torch is used to heat the insert and a stick of the heat-sensitive adhesive. When the stick of heat-sensitive adhesive begins to melt, the adhesive is painted on to each of the inserts and the inserts are then pressed into each end of the hollow arrow shaft. If the cutting of the arrow shaft has not been properly accomplished, however, a burr or other irregularity may remain and the insert will not seat perpendicular to the longitudinal axis of the shaft. This improper seating will skew any components which are later placed within the insert.

Most point inserts have a threaded bore capable of receiving a threaded rod which protrudes from the back of most arrow points. The point is threaded into the point insert and thereby retained within the arrow shaft. The same process is repeated at the nock end of the arrow shaft, but the nock insert utilizes an orifice so sized as to create a friction fit with a shank portion of the nock which is inserted therein.

Fletching made from feathers or plastic vanes are then glued to the arrow shaft. The orientation between the groove in the nock and the fletching in the shaft can influence the flight of the arrow. As an arrow is released, a portion of the fletching contacts the arrow rest to some degree. By rotating the nock relative to the arrow shaft, a process referred to as "indexing," the influence of the contact of the fletching with the arrow rest may be reduced or at least adjusted to compensate for some other influence on the flight characteristics of the arrow.

The indexing process, however, necessitates repeated shooting of the same arrow. Once one arrow is properly indexed, the correct orientation of the nock relative to the fletching must be transferred to other arrows to avoid repeating the entire process. This is problematic, however, because the nock has a friction fit with the insert and the nock is difficult to twist relative to the arrow shaft. Because there is no point of reference with which to compare the two arrows only an approximation of prior indexing can be attained.

An archer may wish to replace the nock or arrow point, or even the point insert or nock insert due to wear or damage. Because of the light weight of the arrows and the use of more powerful bows, the flight speed and therefore impact of arrows has greatly increased in recent years. After repeated impact, the point insert may become damaged and need to be replaced. Likewise, a nock may become broken and need to be removed. It is a difficult and time-consuming task to remove the shank portion of the nock remaining within an arrow shaft and to clean the adhesive from the inside of the arrow shaft when the point insert has been removed. Likewise, when pressing in a new point insert, it is difficult to grip the point insert with pliers in a fashion which allows accurate insertion of the point insert correctly into the shaft.

Removal of a nock insert is very difficult because the inside of the nock insert is smooth and difficult to grasp. To overcome this most archers use a pair of pliers to grasp the outside of the nock insert and pull the insert out as the shaft is heated. Unfortunately, pliers often deform the insert or otherwise damage the insert as it is removed.

When an archer wishes to remove the fletching from an arrow shaft to either replace damaged fletching or to utilize a different type of fletching, the fletching and adhesive used to attach the fletching to the arrow shaft must be stripped from the arrow shaft. Because the adhesive is hard and is bonded to the arrow shaft, a razor knife or blade is typically utilized to remove this adhesive from the shaft. Because of the light-weight materials of which most arrow shafts are now constructed, there is a chance that the razor knife will gouge the arrow shaft and thereby unbalance the arrow shaft and cause permanent damage.

OBJECTS AND BRIEF SUMMARY OF THE INVENTION

It is, therefore, an object of the present invention to provide a tool capable of holding a point insert or a nock insert during heating and insertion of the insert in a manner which allows accurate guidance of the insert into the arrow shaft.

Another object of the present invention is to provide a tool for squaring the end of the cut arrow shaft relative to the longitudinal axis of the arrow shaft.

A further object of the present invention is to provide a tool to deburr the inside of a cut arrow shaft.

A still further object of the present invention is to provide a tool capable of transferring the orientation between a nock groove in the fletching of one arrow shaft to another arrow.

Another object of the present invention is to provide a tool to aid in the cleaning of adhesive residue from the inside of an arrow shaft.

It is still another object of the present invention to provide a tool to aid in the retraction of the shank of an arrow nock remaining within a nock insert.

A still further object of the present invention is to provide a tool for stripping the fletching or vanes from an arrow shaft in a clean and efficient manner without gouging the arrow shaft.

Yet another object of the present invention is to provide a tool for removing nock inserts from arrow shafts without deforming the insert.

Additional objects and advantages of the invention will be set forth in the description which follows, and in part will be inherent from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a device is provided which is intended to aid an archer in the assembly of arrow components. A collection of tools are provided each designed to aid in the performance of a specific task during the arrow assembly process. The tools are designed as implements which can be interchangeably placed within a handle. The handle has a set screw which secures a portion of each of the implements within the handle.

One implement useful during the introduction of a point or nock insert into an arrow shaft is the insert arbor. The insert arbor has a series of annular rings formed about a central cylindrical shaft. The annular rings perform several purposes. One of the purposes of the annular rings is to serve as a stop so that an insert placed over a portion of the cylindrical shaft will abut one of the annular rings and pressure can then be exerted on the insert to press the insert into the arrow shaft.

Another purpose of the annular rings is to provide several diameters over which different sized inserts may be placed. For example, in the preferred embodiment, the central cylindrical shaft is sized to fit inside of a typical nock insert. If a user wishes to utilize the insert arbor with a nock insert having a larger nock opening, however, the other end of the insert arbor having a larger diameter may be placed within the insert. By utilizing a central cylindrical shaft which has a different diameter at each end, several sizes of inserts may be accommodated by only a few insert arbors.

Another purpose served by the annular rings is to form an area between two annular rings within which the set screw for the handle may be engaged to hold the insert arbor within the handle. A central annular ring serves as a stop against the top of the handle. Pressure may than be exerted on the handle against the central annular ring and that pressure will be transferred along the central cylindrical shaft to the end of the insert arbor over which an insert has been placed. The benefit on using the insert arbor is that a nock can be firmly positioned on the arbor and can be easily controlled to insure proper placement during insertion within the shaft.

Another implement which can be secured within the handle is a shaft stripper. The shaft stripper is a blade and a guide both attached to a shaft which has an enlarged shank capable of being received within the handle. The shank has a groove to accommodate the set screw and the shaft is bent at an angle so that the blade contacts the arrow shaft at approximately a 45 degree angle when the shaft guide is in contact with the arrow shaft. In use, an individual places the shaft guide on the arrow shaft and slides the shaft stripper along the arrow shaft toward the fletching. The replaceable blade will then be positioned so that the fletching will be stripped from the shaft as the knife is pressed along the shaft through the fletching. The benefits of the shaft stripper are that the blade will always be at the optimal angle to cleanly and efficiently strip the fletching from the shaft without leaving portions of the fletching and adhesive on the shaft and without gouging the shaft.

Another implement capable of being received within the handle is a retraction screw. The retraction screw is utilized to remove broken nocks from within a nock insert. The retraction screw has an aggressive thread at one end to engage the portion of the broken nock still within the insert, and is capable at the other end of either being received directly by the tool handle or by an intermediate receiver.

An inside diameter cleaning tool is also provided capable of being received within the tool handle for removing residual adhesive from the inside of an arrow shaft after an insert has been removed. The arrow shaft is warmed and the inside diameter cleaning tool is then placed within the shaft and rotated. One end of the inside diameter cleaning tool has a bent configured so as to contact both sides of the inside diameter of the arrow shaft. The bent blade is biased so that the blades scrape against the inside of the arrow shaft. The other end of the inside diameter cleaning tool has a shaft which is either configured to be received by the tool handle or by an intermediate receiver.

Still another implement capable of being received within the handle is a shaft facing cutter. The facing cutter has an annular cutting blade and a perpendicular centrating shaft extending therefrom. The centrating shaft is received within the implement receiving end of the handle. The facing cutter has projecting in the other direction a shaft arbor which is capable of being snugly placed within an arrow shaft and thereby positioning the arrow shaft relative to the facing cutter so that any imperfections caused by cutting the arrow shaft may be removed by rotating the facing cutter against the cut end of the shaft to form a clean perpendicular cut.

Additionally, another implement that is capable of being received within the handle is a deburrer. The deburrer has a conical cutting portion and a stopper portion, with the conical cutting portion having a shape permitting it to be inserted within the alignment bore of the implement receiving end of the handle. The tip of the conical cutting portion is further made so as to be capable of being inserted into an arrow shaft. After cutting an arrow, often burrs are left on the cut end of the arrow shaft. The arrow shaft is slipped into the handle (to guide the shaft) and the arrow shaft end is then located over the deburrer. The arrow shaft is then rotated allowing blades on the conical portion of the deburrer to remove any burrs from the arrow shaft end.

In one preferred embodiment the deburrer and facing cutter are formed so as to be integral with one another. In such an embodiment the deburrer forms the centrating shaft of the facing cutter, allowing the deburrer to be inserted within the alignment bore of the handle and the facing cutter to protrude therefrom. Positioned centrally between the deburrer and the facing cutter is a friction recess allowing the set screw disposed within the handle to be placed within the recess, thereby increasing the amount of friction between the set screw and the implement inserted within the alignment bore.

A nock adjuster is still another implement that is capable of being received within the handle. The nock adjuster has a cylindrical hollow member with a nock holder at one end, the holder being capable of holding the nock during insertion thereof into the arrow shaft and a calibrating rod member which slides relative to the nock to "index" or record the rotational distance between one feather of the fletching of the arrow shaft and the groove in the nock.

In one embodiment the cylindrical hollow member is chamfered toward the second end. In such embodiment, a notch terminates approximately at the beginning of the chamfer. Disposed within the cylindrical hollow member is a set screw that may be frictionally compressed against the calibrating rod member. In this manner, the notch may be used to index or align the nock relative to the vane and this orientation may be recorded and maintained such that subsequent positioning of a nock relative to one vane or feather in another arrow can be obtained by aligning the notch with the feather while the nock is rotated.

Still another implement capable of being received within the handle is a honing steel. The honing steel has a sharpening member and a holding member. In one embodiment of the present invention, the sharpening member is cylindrical so that it is capable of being used to sharpen a broadhead with the point of an arrow. The sharpening member, however, is not limited solely to the use of the point of an arrow, but can also be used with any other device in need of sharpening, such as a knife used during hunting.

Another implement which may be used with the handle is a chamfering tool capable of chamfering the outside of the end of a cut carbon fiber arrow shaft. The benefits of utilizing a chamfering tool are that an even chamfer may be placed on the outside of the carbon fiber shaft as opposed to an uneven chamfer which is often applied when one rotates the shaft on a piece of sandpaper.

BRIEF DESCRIPTION OF THE DRAWINGS

In order that the manner in which the above-recited and other advantages and objects of the invention may be better understood, a more particular description of the invention briefly described above will be rendered by reference to specific embodiments thereof, which are illustrated in the appended drawings, and which constitute the best mode presently contemplated with respect to the invention.

Understanding that these drawings depict only typical embodiments of the invention and are not, therefore, to be considered limiting of its scope, the invention will be described with additional specificity and detail through the use of the accompanying drawings in which:

FIG. 4 is an elevational partially cut-away view of the nock adjuster shown in FIG. 1;

FIG. 5 is an elevational partially cut-away view of a hone shown in FIG. 1;

DETAILED DESCRIPTION OF THE PREFERRED EMBODIMENTS

Figure 1:
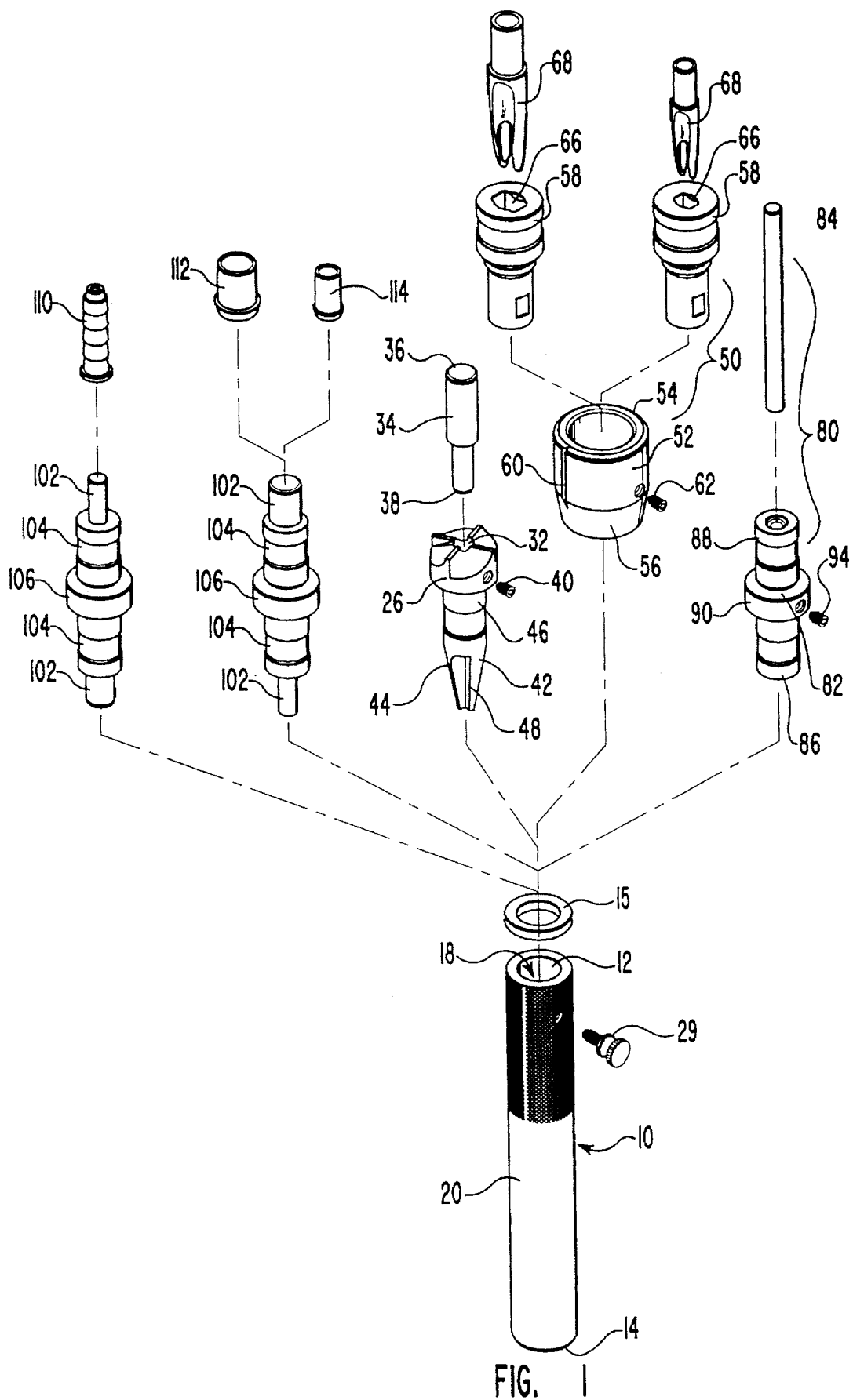
FIG. 1 is an elevational view of a collection of implements capable of being received within a handle.

FIG. 1 illustrates a handle 10 having an implement receiving end 12, an arrow shaft receiving end 14 and a centrally disposed elongate member 20 connecting implement receiving end 12 and arrow shaft receiving end 14. Handle 10 has formed in the interior thereof a longitudinally extending alignment bore 18. Alignment bore 18 has a diameter of sufficient size to be capable of receiving an arrow shaft 30 (see FIG. 3). A ceramic ring 15 may be placed over implement receiving end 12 to insulate the handle from heat applied to nock or point inserts positioned on the implements.

In the present invention, handle 10 is likewise formed to be capable of receiving a collection of implements within alignment bore 18 of implement receiving end 12. Securing means are provided for selectively fixing a preferred implement within alignment bore 18 of implement receiving end 12 of handle 10. By way of example, not limitation, the securing means for selectively fixing a preferred implement within the alignment bore illustrated in FIG. 1 comprises a set screw 22 disposed within handle 10 in communication with alignment bore 18 of handle 10. Set screw 22 may be rotated when a preferred implement is inserted within alignment bore 18 such that set screw 22 is placed in frictional contact with the inserted implement, allowing handle 10 and the preferred implement to rotate and function concomitantly.

Knurling may be provided on the exterior of handle 10 to allow the user of the present invention to securing grip handle 10 while working with a preferred implement that has been disposed with an alignment bore 18 of implement receiving end 12.

Figure 2:
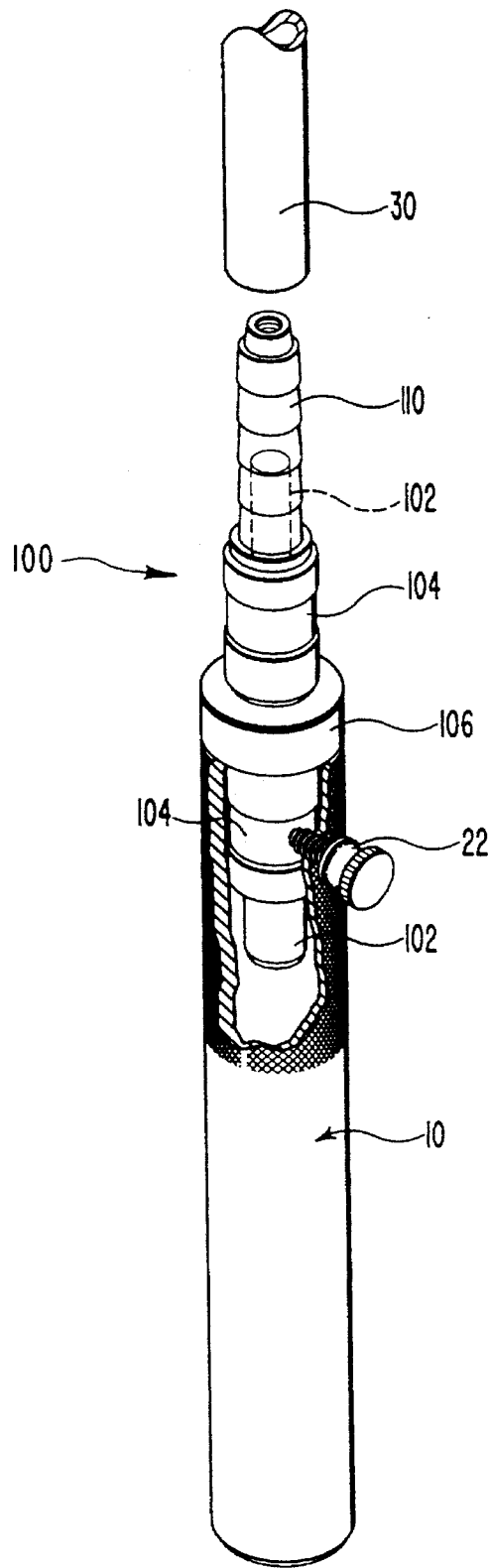
FIG. 2 is an elevational partially cut-away view of the insert arbor shown in FIG. 1 received within the handle of FIG. 1.

FIG. 2 illustrates an insert arbor 100 capable of being received within handle 10. Insert arbor 100 has a central cylindrical shaft 102 which has varying diameters throughout its length. In addition to having varying diameters, a series of annular rings 104 are formed about central cylindrical shaft 102. Annular rings 104 serve several purposes. One purpose is to serve as a stop for an insert which has been placed over a portion of the central cylindrical shaft which has a diameter smaller than the annular ring. The annular ring then serves as a platform for applying pressure to the insert as the insert is pressed into the arrow shaft.

Another purpose of the annular rings is to provide various sized arbors over which the insert may be placed. As the interior diameter of the insert varies from insert to insert, the annular rings provide several diameters of arbor over which the insert can be placed. This allows the insert arbor 100 to be used with several point and nock inserts having different inside diameters. The varying diameters of the central cylindrical shaft also serve this purpose.

Another purpose of the annular rings is to aid in the fixing of the insert arbor into the handle. When insert arbor 100 is slid into handle 10, a central annular ring 106 abuts the top of handle 10. Central annular ring 106 has a diameter which exceeds the inside diameter of the handle. When insert arbor 100 is held within handle 10, therefore, close to one-half of the insert arbor is held within the handle. Annular rings 104 are spaced so that the set screw will engage central cylindrical shaft 102 in an area between two adjacent annular rings. This secures insert arbor 100 within the handle thereby allowing a user to pull on insert arbor 100 without having insert arbor 100 become dislodged from handle 10.

It will be appreciated that with the varying diameters of central cylindrical shaft 102, insert arbor 100 may also be utilized as a mount for components other than arrow shaft inserts and can also serve as a mount for additional tools.

Figure 3:
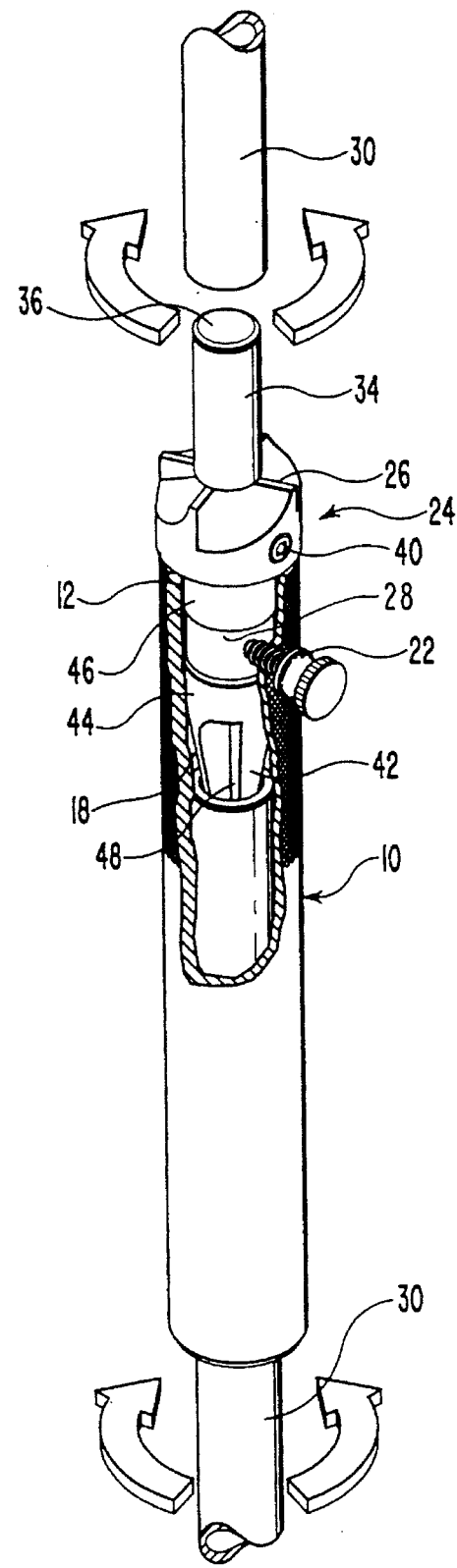
FIG. 3 is an elevational partially cut-away view of the facing cutter shown in FIG. 1 received within the handle.

FIG. 3 illustrates a facing cutter 24 disposed within alignment bore 18 of implement receiving end 12 of handle 10. Facing cutter 24 has an annular cutting blade 26 and a centrating shaft 28 which extends longitudinally from annular cutting blade 26. Centrating shaft 28 is capable of being received within alignment bore 18 of implement receiving end 12 of handle 10.

In the preferred embodiment of the present invention, facing cutter 24 has extending normal thereto a shaft arbor 34. Shaft arbor 34 has an end 36 shaped so as to be capable of being inserted into arrow shaft 30. After receiving end 38 within lumen 32, set screw 40 disposed within annular cutting blade 26 is placed in frictional communication with second end 38 of shaft arbor 34.

Upon applying a sufficient amount of friction by set screw 40 upon second end 38 of shaft arbor 39, first end 36 of shaft arbor 34 may be placed in shaft arrow 30. Having previously placed set screw 32 of handle 10 in frictional communication with centrating shaft 28, handle 10 may be rotated against arrow shaft 30 to permit the end of arrow shaft 30 to be shaved until any imperfections from cutting the shaft are removed.

Deburrer 42 is illustrated in FIGS. 1 and 3. Substantially conical portion 44 is contiguous to a stopper portion 46. Conical cutting portion 44 has a shape capable of being inserted into the end of arrow shaft 30 and stopper portion 46 is capable of being received within alignment bore 18 of implement receiving end 12 of handle 10.

In the presently preferred embodiment of the present invention deburrer 42 comprises centrating shaft 28 and face cutter 24. Thus face cutter 24 and deburrer 42 may be formed so as to be integral with one another, allowing the user of the present invention to quickly and efficiently finish an arrow shaft upon cutting the length to an appropriate size.

This can be accomplished by placing an arrow shaft upon the shaft arbor and rotating the face of the arrow shaft against the facing cutter to remove any imperfections. An arrow shaft can also be placed within the arrow shaft receiving end of the handle 10 and be slid into the alignment bore and inserted over the deburrer. The handle is then rotated and the deburrer will remove any burrs left from cutting the arrow shaft. The handle serves as a guide to align the shaft with the deburrer. In one embodiment of the present invention deburrer 42 comprises cutting blades 48 extending substantially along conical cutting portion 44.

In FIG. 4, a portion of nock adjuster 50 is depicted disposed within alignment bore 18 of implement receiving end 12 of handle 10. Nock adjuster 50 has a substantially cylindrical hollow member 52 having first end 54 and second end 56. Calibrating rod member 58 is further provided and a portion of calibrating rod member 58 is capable of being disposed within cylindrical hollow member 52.

Means for indexing a nock and permitting the position of the nock to be recorded and transferred relative to the vane are further provided. By way of example and not limitation, this means comprises a notch 60 formed in first end 54 of cylindrical hollow member 52. Set screw 62 is disposed within cylindrical hollow member 52 and is capable of being placed in frictional communication with calibrating rod member 58 when a portion of calibrating rod member 58 is disposed within cylindrical hollow member 52. Calibrating rod member 58 has formed in the interior thereof a longitudinally extending lumen 66 capable of engaging nock 68. A portion of calibrating rod member 58 is likewise capable of being received within alignment bore 18 of implement receiving end 12 of handle 10.

In a preferred embodiment of the present invention, calibrating rod member 58 of nock adjuster 50 further comprises an annular stabilization ridge 70 capable of being received by and complimenting the shape of annular ridge 64 of cylindrical hollow member 52. When the calibrating rod member is disposed within the cylindrical hollow member such that a portion of the calibrating rod member may be received by the alignment bore of the implement receiving end of the handle, the stabilization ridge is placed against and compliments the annular ridge depending the second end of the hollow cylindrical member.

FIG. 5 illustrates a honing steel 80 received within the alignment bore of implement receiving end 12 of handle 10. Honing steel 80 comprises a honing member 82 and a sharpening member 84. Honing member 82 has a proximal end 86, a distal end 88 and a halting member 90 integral with honing member 82 and connecting proximal end 86 and distal end 88. Proximal end 86 of honing member 82 is capable of being received within alignment bore 18 of implement receiving end of handle 10. Receiving bore 92 is placed at distal end of 88 of honing member 82 and is capable of selectively engaging sharpening member 84. Set screw 94 is disposed within honing member 82 for selectively securing sharpening member 84 within receiving port 92 at honing member 82.

In a preferred embodiment of the present invention, sharpening member 84 of honing steel 80 is cylindrical and compliments the shape of receiving port 92 of distal end 88 of honing member 82. The cylindrical shape of the sharpening member is advantageous to an individual wishing to sharpen a point that has been previously placed or will be previously placed on an arrow shaft. The honing steel and likewise be used to sharpen knives in preparation of or during hunting.

Calibrating rod member 58 may further be comprised of a friction recess capable of commuting with setting means with vane adjuster 50 increase the friction therebetween.

Figure 6:
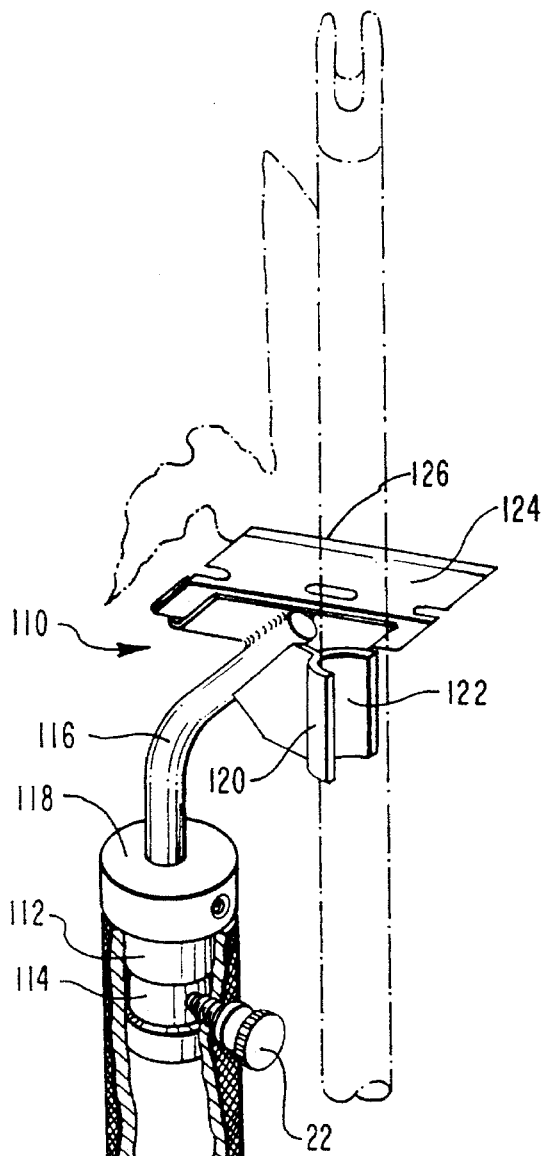
FIG. 6 is a partially cut-away elevational view of a shaft stripper received within the handle of FIG. 1.

FIG. 6 illustrates a shaft stripper 110 for use in removing fletching and adhesive from the exterior of an arrow shaft. Shaft stripper 110 has a shank 112 which is so sized and configured so as to be receivable in handle 10. Shank 112 is configured with a groove 114 into which the set screw of the handle may be engaged. Extending outwardly from shank 112 is an arm 116 which extends normal to a face 118 of shank 112. After extending normal for a distance, arm 116 is bent at approximately a forty-five degree angle from the normal portion of arm 116. Depending from the angled portion of arm 116 is a shaft guide 120. Shaft guide 120 has formed at the bottom thereof a groove 122 which is sized and shaped so as to conform to and slide along the exterior surface of an arrow shaft. A blade 124 is also attached to the bent portion of arm 116 but extends parallel to the longitudinal access of the bent portion of the arm. Blade 124 extends beyond arm 116 to a point wherein the edge 126 of blade 124 contacts an arrow shaft when the arrow shaft is in contact with groove 122.

As a result of this configuration, a user may hold shaft stripper 110 parallel to an arrow shaft and by placing groove 122 on the arrow shaft may push shaft stripper 110 along the length of the arrow shaft until edge 126 encounters adhesive or fletching on the exterior of the arrow shaft. As blade 124 is angled so as to provide the optimum interface between edge 126 and the adhesive or fletching, the fletching and adhesive are easily and quickly stripped from the arrow shaft without allowing edge 126 to gouge or mar the arrow shaft.

Figures 7, 8:
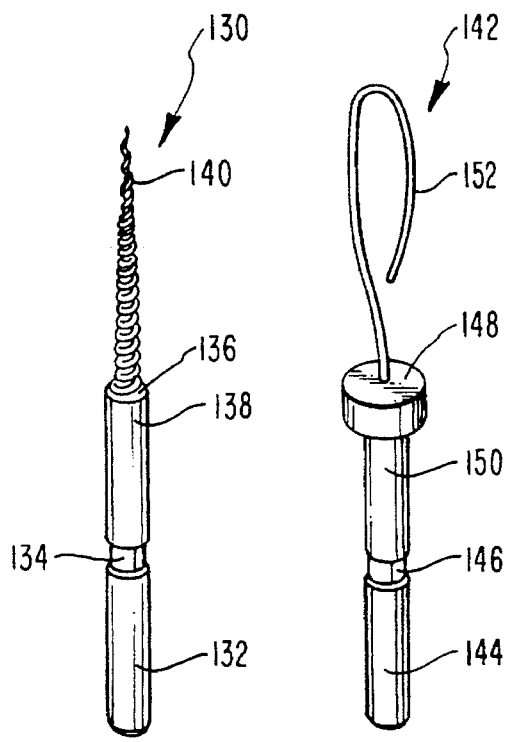
FIG. 7 is an elevational view of a nock remover.
FIG. 8 is an elevational view of an inside diameter cleaning tool.

FIG. 7 illustrates a nock retraction screw to be used in removing broken nocks from nock inserts. Retraction screw 130 has a shank 132 capable of being received by handle 10. Shank 132 also has a groove 134 in which the set screw may be engaged to secure the retraction screw to the handle. Projecting normally from the face 136 of shank 132 is a shaft 138 which has a tapered threaded end 140.

In use, tapered threaded end 140 is screwed into the portion of the nock which remains within a nock insert to either engage the nock sufficiently so that the nock can be pulled out from the nock insert or to grind the nock and break the nock into several pieces which can then be removed from the nock insert.

FIG. 8 illustrates an inside diameter cleaning tool 142. Cleaning tool 142 has a shank 144 with a groove 146 formed about the circumference of the shank. Shank 144 is capable of being received within handle 10 and groove 146 serves to allow a purchase for the set screw to retain the shank within the handle. Projecting normally from a face 148 of shank 144 is a shaft 150 to which is attached a curved blade 152. Blade 152 is curved so as to fit snugly within inside diameter of an arrow shaft.

In use, inside diameter cleaning tool 142 is placed within a heated arrow shaft to remove the residual adhesive left after an insert has been removed from the arrow shaft. Curved blade 152 scrapes the inside of the arrow shaft and the residue adheres to the curved blade and can then be removed from the arrow shaft. The blade also digs into residue to scrape it away. If residue is allowed to build up, the extra weight can affect the balance of the arrow and thereby alter the flight characteristics of the arrow or may interfere with the proper alignment of an insert subsequently placed within the arrow shaft.

Figure 9:
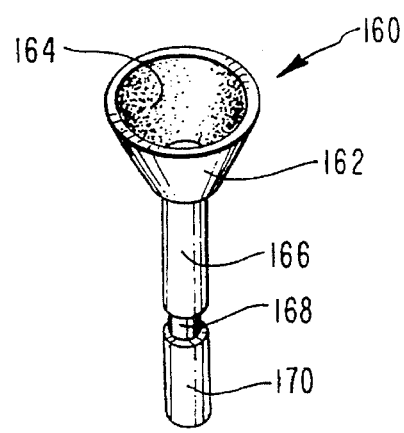
FIG. 9 is an elevational view of a chamfer cup.

FIG. 9 illustrates a honing cup 160 which is capable of being received by handle 10. An abrasive cup 162 has formed therein an abrasive surface 164 to chamfer the end of an arrow shaft. The cup is attached to a shaft 166 which has a receiving portion 174 capable of being received within the handle 10. A groove 168 is formed so that set screw 22 may be engaged therewith. Adhesive cup 162 is tapered so that the smallest diameter of the cup is slightly smaller than the diameter of a typical arrow shaft. Instead of rubbing the arrow shaft on a piece of sandpaper set upon a table, a user merely rotates the adhesive cup around the arrow shaft to form an even chamfer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tool intended for use in facing cut arrow shafts, the tool comprising:

(a) a handle having an implement receiving end, an arrow shaft receiving end, and a centrally disposed elongate member connecting the implement receiving end and the arrow shaft receiving end, said handle having formed in the interior thereof a longitudinally extending alignment bore, said alignment bore having a diameter of sufficient size so as to be capable of receiving an arrow shaft;

(b) a facing cutter having an annular cutting blade and a centrating shaft extending longitudinally from said annular cutting blade, said centrating shaft capable of being received in said alignment bore of said implement receiving end of said handle; and (c) securing means for selectively fixing said facing cutter within said alignment bore of said implement receiving end of said handle, thereby permitting said handle and said facing cutter to work concomitantly.

2. A multi-purpose tool as recited in claim 1, wherein said centrating shaft of said facing cutter further comprises a deburrer integral with said facing cutter, a said deburrer having a shape capable of being inserted into an arrow shaft.

\* \* \* \* \*